June 26, 1951  R. S. HINSEY  2,558,558
MECHANISM CONTROL
Filed July 24, 1948
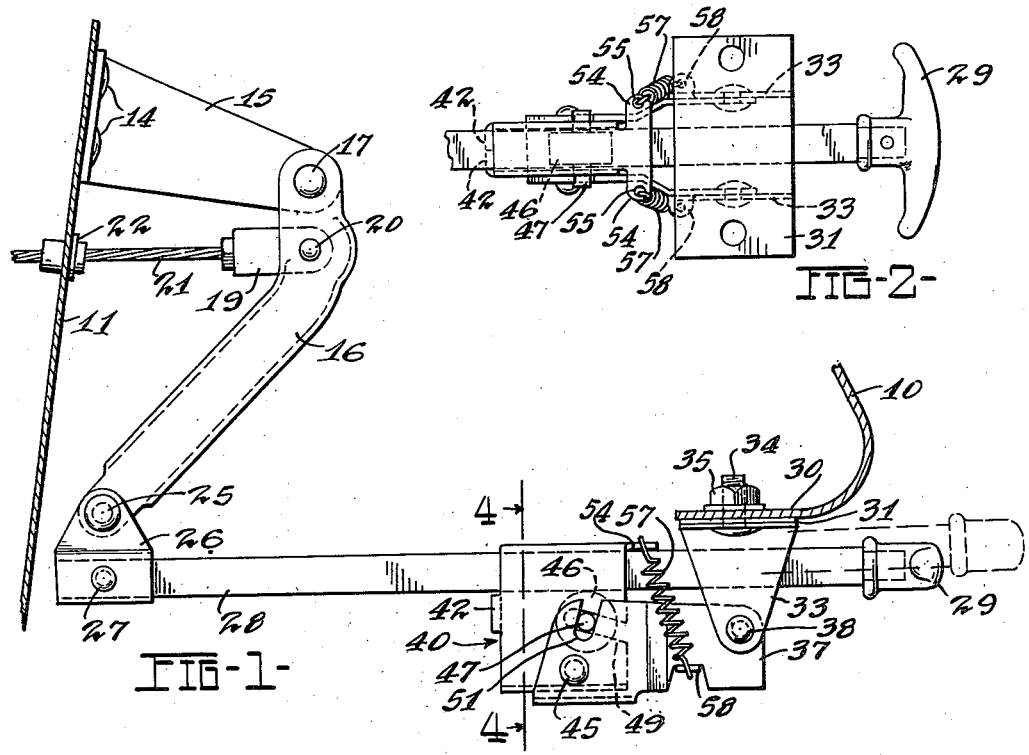
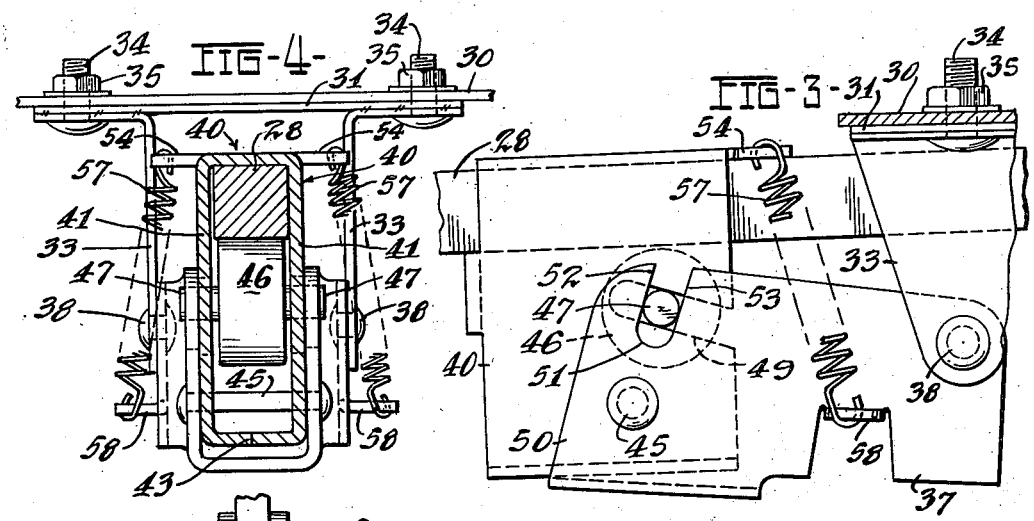
Inventor
ROBERT S. HINSEY
By Harry O. Ernsberger
Attorney Patented June 26, 1951

2,558,558

UNITED STATES PATENT OFFICE 2,558,558

MECHANISM CONTROL

Robert S. Hinsey, Toledo, Ohio, assignor to The Bingham-Herbrand Corporation, Toledo, Ohio, a corporation of Ohio Application July 24, 1948, Serial No. 40,447

9 Claims. (Cl. 74—531)

This invention relates to mechanism actuating or control devices and more especially to an arrangement for actuating and controlling the emergency or parking brakes of an automotive vehicle.

The invention embraces the provision of a longitudinally movable member or actuating means in combination with a friction clutch means for retaining the longitudinally movable member in adjusted position.

An object of the invention resides in the provision of a mechanism actuating means embodying a longitudinally movable member connected to the mechanism to be actuated in conjunction with a friction clutch means for retaining the longitudinally movable member in adjusted position, the clutch means and member being so constructed and mounted that relative movement of the member in a transverse direction effects a release of the clutching means.

Another object of the invention resides in a brake actuating and control means for vehicles wherein said means is inclusive of a longitudinally movable pull bar in combination with a roller type clutch embodying resilient means for normally urging the clutch toward clutching engagement with the pull bar and wherein relative movement of the pull bar in a transverse direction operates to withdraw the roller from clutching engagement with the bar.

Still a further object of the invention is the provision of an actuating means for the emergency or parking brakes of an automotive vehicle which includes an actuating member of the pull type in conjunction with a roller clutch construction, the pull bar and clutch mounting elements being fabricated of sheet metal whereby a brake actuator of this character may be inexpensively manufactured in large quantities and at the same time insure interchangeability of the parts and elements making up the assembly.

A further object of the invention is the provision of a mechanism actuating means embodying a pull bar and friction clutch for holding the pull bar in adjusted position, the arrangement embodying a mounting means for the pull bar and clutch whereby the clutch may be released with little effort through relative movement of the pull bar in a lateral direction.

Further objects and advantages are within the scope of this invention such as relate to the arrangement, operation and function of the related elements of the structure, to various details of construction and to combinations of parts, elements per se, and to the economies of manufacture and numerous other features as will be apparent from a consideration of the specification and drawing of a form of the invention, which may be preferred, in which:

Figure 1 is an elevational view illustrating an embodiment of my invention as utilized for actuating the parking or emergency brakes of a vehicle showing the mechanism associated with the instrument panel and dash board of an automotive vehicle;

Figure 2 is a top plan view of a portion of the mechanism control or actuating device shown in Figure 1 with the instrument panel of the vehicle removed;

Figure 3 is an enlarged view of a portion of the pull bar, clutch, and the clutch mounting means illustrated in clutch releasing relation;

Figure 4 is an enlarged sectional view taken substantially on the line 4—4 of Figure 1, and Figure 5 is a view of the forward end of the pull bar construction showing a means of connecting the bar to mechanism to be actuated.

While I have illustrated an arrangement of my invention as particularly adapted for actuating or controlling the emergency or parking brakes of a vehicle, it is to be understood that I contemplate the incorporation of the arrangement of my invention with any mechanism wherein the same may be found to have utility.

Refering to the drawings in detail, an instrument panel of a vehicle is illustrated at 10 which is spaced from the dash board 11. Supported upon the dash board as by means of rivets 14 is a bracket 15 to which is pivotally connected a lever member or arm 16 by means of a stub shaft or pivot pin or fulcrum 17. The lever member 16 is adapted to be connected to the brake mechanism of the vehicle, such connecting means as illustrated including a clevis 19 secured to the lever member 16 by means of a pin 20, the clevis 19 being secured to a flexible metallic cable 21 which passes through a grommet or fitting 22 fixed in an opening in the dash board 11 and is connected to the brake mechanism (not shown) of the vehicle.

One end of the lever member 16 is pivotally connected by means of a shaft or rivet 25 with a U-shaped fitting or clip 26 which surrounds the end portion of a longitudinally movable member or pull bar 28, the latter being provided with a manipulating handle or grip portion 29. The pull bar 28 is preferably of non-circular configuration as, for example, of rectangular cross section, and is fixed to the clip or bracket 26 by means of the rivet 27 or other suitable means.

The instrument panel 10 of the vehicle is provided with a flange portion 30 to which is attached a plate 31 to which is welded or otherwise secured a pair of L-shaped members 33. The laterally extending portions of L-shaped members 33 and the connecting plate 31 are provided with openings which register with openings in the flange 30 of the instrument panel 10, and are adapted to receive securing bolts 34 and nuts 35 for rigidly connecting the L-shaped members 33 to the instrument panel. Articulately supported on the L-shaped members 33 is a bracket or element 37 of U-shaped configuration as shown in Figure 4, the element 37 being pivotally supported upon members 33 by means of rivets 38.

Mounted upon the pull bar 28 is a member or housing 40 preferably formed of sheet metal to rectangular configuration as shown in Figure 4. The housing 40 is formed with substantially parallel walls 41 which straddle the pull bar 28 but with sufficient clearance to facilitate slidable movement of the pull bar through the housing. The lower extremities of the walls 41 of member 40 are bent inwardly as shown in Figure 4 and abut one another as at 43 to form a closed configuration. The walls 41 of the housing are formed with transversely extending ear portions 42 arranged beneath the pull bar 28 and form a guiding means to maintain the bar and housing 40 in proper relationship.

The forward portion of element 37 is pivotally connected to the member 40 by means of a shaft or rivet 45 providing for relative pivotal movement between elements 37 and bracket 40. Disposed adjacent to and adapted for engagement with the pull bar 28 is a clutch member or clutching means in the form of a roller 46 which is provided with cylindrical projecting tenons 47. The side walls 41 of member 40 are formed with elongated open ended slots 49 which are angularly disposed or canted with respect to the longitudinal axis of the pull bar 28. The width of the slots 49 is such as to snugly receive the tenons 47 provided on the clutch roller 46. The inclination or angularity of the slots 49 is such that movement of the roller 46 in a left hand direction as viewed in Figure 1 will cause a wedging engagement between the clutch roller and the pull bar 28.

The parallel wall portions 50 of the bracket 37 are provided with slots 51, the front and rear walls 52 and 53 being parallel and arranged substantially at right angles to the walls of the slots 49 as particularly shown in Figures 1 and 3. The width of the slots 51 is such as to snugly receive or accommodate the tenons 47 associated with the clutch roller or element 46. The member 40 is provided with transversely projecting ear portions 54 which are provided with openings 55 to receive hook-like configurations formed at the upper extremities of contractile coil springs 57. The side walls 50 of bracket 37 have ear portions 58 extending outwardly which are provided with openings to accommodate the hook-like formations formed at the lower ends of the springs 57. Thus the springs 57 normally retain the member 40 and bracket 37 in the position illustrated in Figure 1 whereby the clutch element or roller 46 is urged into frictional engagement with the bar 28 by reason of the fact that the walls 53 of slots 51 in engagement with the tenons 47 force the clutch roller 46 into frictional engagement with the bar 28. Thus when the bar 28 is moved longitudinally in a right hand direction as viewed in Figure 1, the clutch roller 46, being constantly urged into engagement with the bar under the influence of the springs 57, will frictionally retain the bar in any position of longitudinal adjustment to retain the vehicle brakes in "set" position. When it is desired to disengage the clutch roller or member 46 from the bar 28 in releasing the brakes, the operator moves the handle member 29 and bar 28 upwardly or in a direction transverse to its longitudinal axis to a position as indicated in dotted lines in Figure 1 and as indicated in full lines in Figure 3. This relative vertical movement of the bar 28 elevates the housing 40 causing relative pivotal movement between the housing 40 and the bracket 37. This relative pivotal movement causes the walls 52 of slots 51 in the side walls 50 to move the tenons 47 of the clutch roller or member 46 in a right hand direction as viewed in Figures 1 and 3. At the same time that the clutch roller 46 is thus moved in a right hand direction, the downwardly inclined slots 49 causes the clutch roller 46 to be moved downwardly away from the bar 28 to disengage the clutch from the bar. This position of the parts is illustrated in detail in Figure 3. With the clutch 46 thus disengaged from the bar 28, the latter may be moved longitudinally in a right hand direction free of the clutch so as to move the lever 16 toward "brake release" position. When the operator releases his grasp upon the handle member 29 after the bar has been moved or returned to "brake release" position as shown in Figure 1, the bracket 37 again moves relatively about the axis of the pivot or shaft 45 whereby the housing 40 and bracket 37 are returned to their normal positions as shown in Figure 1. The side walls 53 of the slots 51 and the upwardly inclined walls of slots 49 guide or direct the clutch element or roller 46 into frictional engagement with the bar 28. Upon subsequent longitudinal movement of the bar 28 in a right hand direction as viewed in figure 1, the lever 16 may be rotated about its fulcrum 17 in a counterclockwise direction and a setting of the brakes effected, the clutch 46 frictionally preventing return movement of the bar 28 until a release thereof is effected by relative upward movement of the bar as hereinbefore explained.

If it is desired to utilize a downward movement of the bar 28 to effect a relative pivotal movement between bracket 37 and housing 40 to release the clutch 46, the bracket 37, housing 40 and parts carried thereby may be inverted from the position shown in Figure 1. This invention of parts does not change the mode of operation except to effect the release of clutch 46, a downward movement of handle 29 is had in lieu of an upward movement thereof as shown in Figure 1.

While I have illustrated a preferred form of my invention as utilized for actuating or controlling the parking or emergency brakes of a vehicle, I contemplate the use of the arrangement of my invention for controlling any type of mechanism wherein an actuator or controlling device of this nature may be desirable.

It is apparent that, within the scope of the invention, modifications and different arrangements may be had other than is herein disclosed, and the present disclosure is illustrative merely, the invention comprehending all variations thereof.

What I claim is:

1. A device for controlling an actuating mechanism including in combination, a support; a bar adapted to be connected to mechanism to be actuated; said bar being mounted for longitudinal and transverse movements relative to said support; a member mounted on said bar; means including a bracket articulately connected to said support and said member; a clutch element associated with said member and adapted for engagement with said bar to hold the latter in longitudinally adjusted position; said bracket having engagement with said clutch member whereby movement of said bar in a direction transversely of its longitudinal axis causes the clutch element to be withdrawn from engagement with the bar.

2. A device for controlling mechanism comprising, in combination, a support, a longitudinally movable bar adapted to be connected to the mechanism to be actuated; a bracket pivotally connected to said support; a member associated with said bar; said bracket and said member being pivotally connected together; a clutch means associated with said member and adapted for engagement with the bar to frictionally retain the latter in adjusted position, and means formed on said bracket and said member for controlling the position of said clutch means whereby transverse movements of said bar relative to its longitudinal axis causes relative pivotal movement between said bracket and said member to effect a release of the clutch means.

3. Mechanism actuating means comprising, in combination, a support; a bar adapted to be connected to the mechanism to be actuated; said bar being mounted for longitudinal and transverse movement relative to said support; said bar being of non-circular cross section; a sheet metal housing member surrounding said bar and having a wall thereof in engagement with the exterior surface of said bar; a clutch element disposed in said housing member and adapted for frictional engagement with the bar to hold the latter in adjusted position, and means including a bracket articulately connecting said housing member and said support and having engagement with said clutch element whereby relative movement of said bar in a transverse direction with respect to its longitudinal axis effects movement of said housing member and bracket relative to said support to disengage the clutch element from the bar.

4. A device for manipulating the parking brakes of a vehicle, comprising in combination; a longitudinally movable bar adapted to be connected to the brakes; a member mounted on said bar; a clutch roller associated with said member and adapted to frictionally engage the bar to hold the latter in adjusted position; a relatively stationary support; means articulately connecting said member with said support; said clutch roller having tenons formed thereon; said member and said connecting means being formed with slots accommodating said tenons whereby relative movement between said member and said connecting means effects a release of said clutch roller.

5. A device for actuating the parking brakes of a vehicle comprising, in combination; a longitudinally movable bar; a relatively stationary support; a hollow member formed of sheet metal surrounding said bar; a clutch roller disposed within said hollow member; tenons formed on said clutch roller; a bracket articulately connected to said housing member with said support; said bracket and said housing member having parallel wall portions provided with slots to receive the tenons of said clutch roller; resilient means connecting said hollow member and said bracket for normally urging said bracket and hollow member toward one position and said roller into engagement with said bar; said slots in said hollow member and bracket being arranged whereby relative movement between said member and bracket being arranged whereby relative movement between said member and bracket disengages said clutch roller from said bar whereby the latter may be moved toward brake releasing position.

6. A device for actuating the parking brakes of a vehicle, comprising in combination, a support; a bar of non-circular cross section mounted for longitudinal and transverse movements relative to said support; a housing surrounding said bar; a U-shaped bracket having parallel wall portions pivotally connected to said support and to said housing; said pivotal connections being in spaced relation; a clutch member having tenons associated therewith, the wall portions of said housing and said bracket having pairs of slots adapted to receive said tenons; the slots in the housing being angularly arranged with respect to the slots in said bracket; means for normally maintaining the housing and bracket in a pre-determined relationship with said clutch roller in frictional engagement with the bar; said sets of slots being so arranged that movement of said bar in a transverse direction with respect to said support causes relative pivotal movement between said housing and said bracket whereby said clutch roller is withdrawn from frictional engagement with said bar.

7. A device for actuating the parking brakes of a vehicle, comprising, in combination, a support; a longitudinally movable bar of non-circular cross section; a sheet metal housing surrounding said bar; a U-shaped bracket having parallel wall portions pivotally connected to said support and to said housing; a clutch roller having axially arranged tenons associated therewith, the wall portions of said housing and said bracket having pairs of slots adapted to receive said tenons; the slots in the housing being angularly arranged with respect to the slots in said bracket; resilient means connecting said housing and said bracket for normally maintaining the housing and bracket in a pre-determined relationship with said clutch roller in frictional engagement with the bar; said sets of slots being so arranged that movement of said bar in a transverse direction causes relative pivotal movement between said housing and said bracket whereby said clutch roller is withdrawn from frictional engagement with said bar.

8. A device for actuating the parking brakes of a vehicle including, in combination, a relatively stationary support; a bar adapted to be connected to the brakes and arranged for longitudinal and transverse movements relative to said support; a member mounted on said bar; a clutch element mounted on said member adapted for engagement with said bar; a bracket pivotally connecting the support and said member; said bracket engaging said clutch element; means engageable with the bracket biasing said clutch element toward clutching engagement with said bar for retaining the latter in longitudinally adjusted position, transverse movement of the bar relative to the support effecting pivotal movement of the bracket to disengage the clutch element from the bar.

9. A device for manipulating the parking brakes of a vehicle, including in combination, a bar adapted to be connected to the brakes; said bar being mounted for relative longitudinal and transverse movements; a member mounted on said bar; a clutch roller associated with said member and adapted to frictionally engage the bar to hold the latter in adjusted position; a relatively stationary support; a bracket pivotally connected to said support and said member; said member and said bracket being formed with slots normally disposed in substantially right angular relation; the walls of said slots engaging said clutch roller whereby relative transverse movement of said bar effects relative movement between said member and said bracket to release the clutch roller from frictional engagement with said bar.

ROBERT S. HINSEY.

REFERENCES CITED

The following references are of record in the file of this patent:

UNITED STATES PATENTS

| Number    | Name     | Date          |
|-----------|----------|---------------|
| 1,203,492 | Coleman  | Oct. 31, 1916 |
| 2,266,058 | McCarthy | Dec. 16, 1941 |
| 2,274,133 | Ferguson | Feb. 24, 1942 |
| 2,299,508 | Skareen  | Oct. 30, 1942 |